(12) United States Patent
Annecke et al.

(10) Patent No.: US 7,247,039 B2
(45) Date of Patent: Jul. 24, 2007

(54) CONTACT SAFETY DEVICE FOR PIN-AND-SOCKET CONNECTORS WITH A SHORTING BAR WITH AN INTEGRATED CIRCUIT ELEMENT

(75) Inventors: Alfred Annecke, Heilbronn (DE); Hans-Ulrich Müller, Pfedelbach (DE)

(73) Assignee: Amphenol-Tuchel Electronics GmbH, Heilbronn (DE)

( * ) Notice: Subject to any disclaimer, the term of this patent is extended or adjusted under 35 U.S.C. 154(b) by 0 days.

(21) Appl. No.: 11/341,658

(22) Filed: Jan. 30, 2006

(65) Prior Publication Data
US 2006/0172574 A1    Aug. 3, 2006

(30) Foreign Application Priority Data
Feb. 2, 2005   (DE) ................. 10 2005 004 920

(51) Int. Cl.
*H01R 29/00* (2006.01)
(52) U.S. Cl. .................. 439/188; 439/513
(58) Field of Classification Search ............ 439/188, 439/507, 510, 511, 512, 513, 514
See application file for complete search history.

(56) References Cited
U.S. PATENT DOCUMENTS

| | | | |
|---|---|---|---|
| 4,464,583 A | * | 8/1984 | Holmgren ................ 307/147 |
| 6,166,452 A | * | 12/2000 | Adams et al. ............. 307/10.1 |
| 6,220,163 B1 | | 4/2001 | Duguet et al. |
| 6,422,897 B1 | * | 7/2002 | Odorfer ..................... 439/510 |
| 2002/0009924 A1 | | 1/2002 | Little et al. |

FOREIGN PATENT DOCUMENTS

| | | |
|---|---|---|
| DE | 199 35 970 | 2/2001 |
| DE | 19935970 A1 * | 2/2001 |
| DE | 102 27 016 | 1/2004 |
| EP | 0 745 519 | 12/1996 |
| EP | 0 802 092 | 10/1997 |
| EP | 1 043 201 A2 | 10/2000 |
| EP | 1 073 160 A1 | 1/2001 |
| EP | 1 251 602 | 10/2002 |
| EP | 1 043 201 A3 | 11/2002 |
| EP | 1 339 139 | 8/2003 |
| WO | WO 99/36293 | 7/1999 |

OTHER PUBLICATIONS

European Search Report dated Apr. 4, 2006.

* cited by examiner

*Primary Examiner*—James R. Harvey
*Assistant Examiner*—Travis Chambers
(74) *Attorney, Agent, or Firm*—Blank Rome LLP

(57) ABSTRACT

The invention concerns a contact safety device for pin-and-socket connectors with an inserted state and a preassembled state, in which a safety mechanism is provided in the contact safety device to secure ignition contacts of the primer against interference and that safety mechanism comes into contact with a shorting bar in such a way that when/after the shorting bar is separated, the safety mechanism automatically goes into operation.

13 Claims, 8 Drawing Sheets

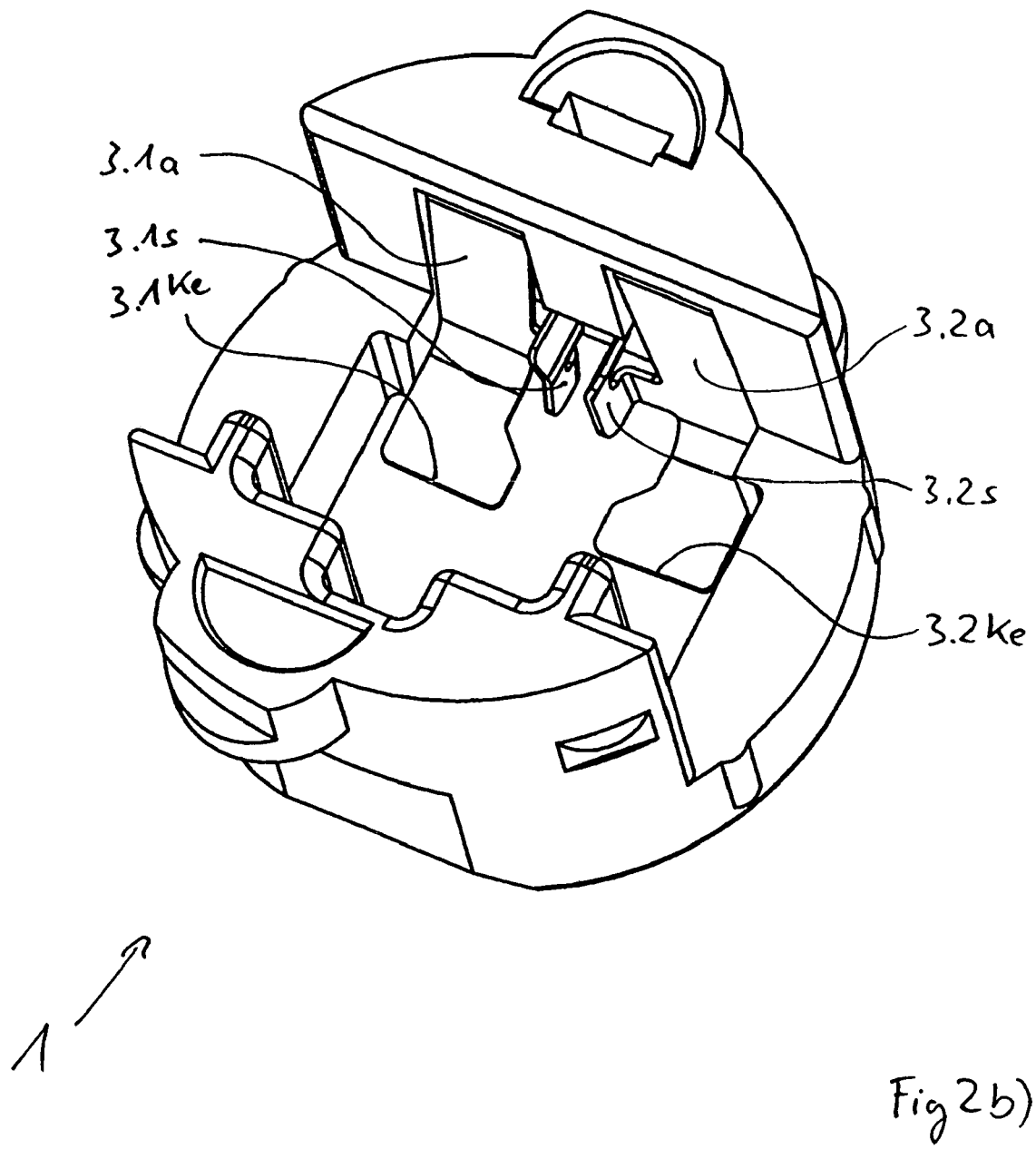

Figure 1A:
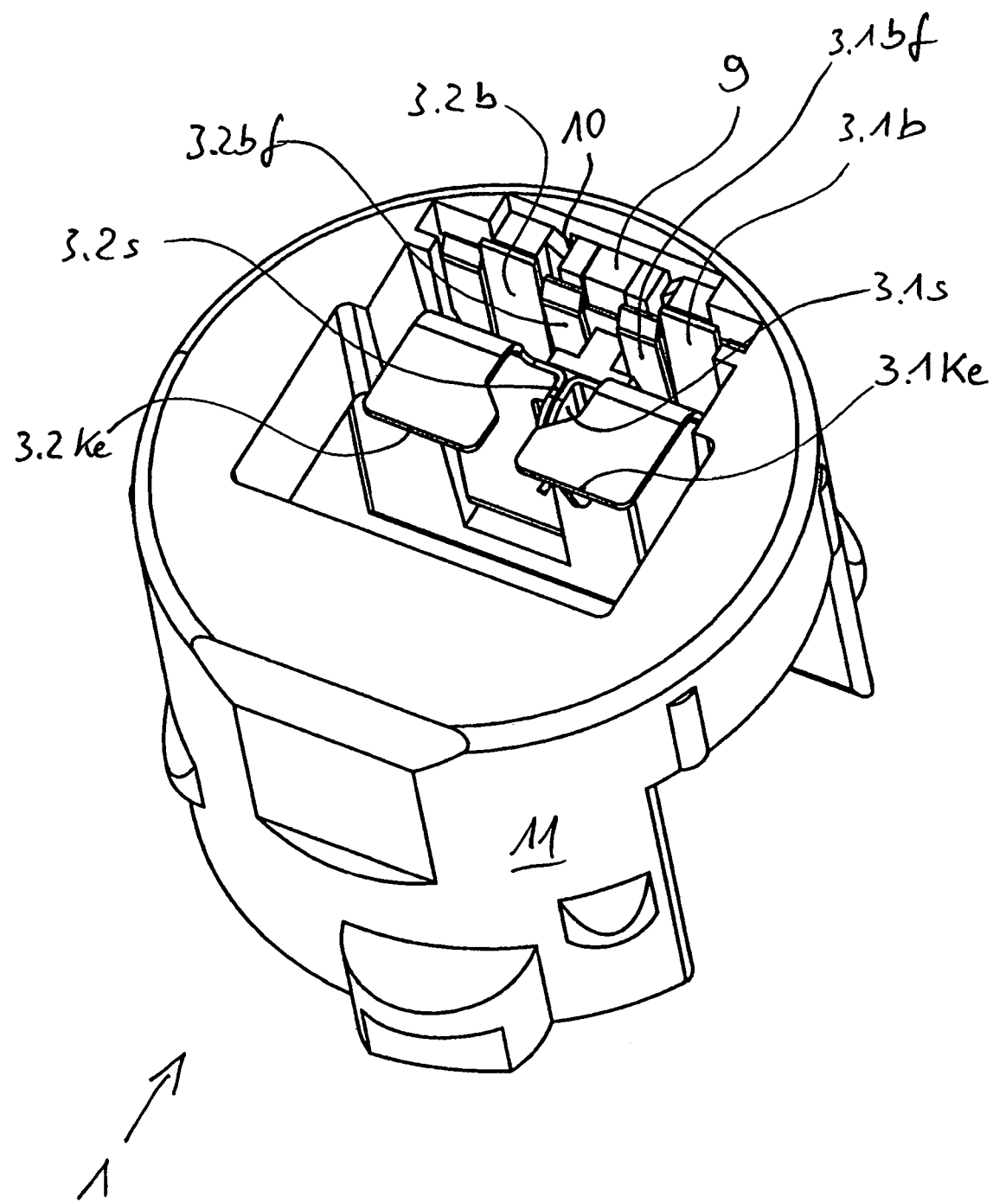

CONTACT SAFETY DEVICE FOR PIN-AND-SOCKET CONNECTORS WITH A SHORTING BAR WITH AN INTEGRATED CIRCUIT ELEMENT

The present invention concerns a contact safety device for electrical pin-and-socket connectors with a shorting bar, which is suited for use between a primer for airbags and a control device of a motor vehicle.

Electrical pin-and-socket connectors with such primers are disclosed, for example, in DE 102 27 016 A1, whereby the electrical pin-and-socket connector usually consists of an L-shaped case with a nozzle that is inserted into the contact safety device provided in the ignitor. The partly complex electrical pin-and-socket connectors, which are often provided with a primary and secondary latching device, should have the smallest possible dimensions with the highest possible operational safety.

Due to the increasing penetration of electronics into motor vehicles the problem of their reciprocal influence on each other is also rising. Special problems lie in the fact that very different electronic units are housed in a very tight space and must operate in good order.

There are both sensitive analogous devices (e.g., radio receivers, telephones, radio plants) and digital devices (e.g., injection and ignition controls, ABS controls, combustion mix controls [λ-probes], on-board computers), as well as motor drives and control valves (e.g., dynamos, cranking motors, window openers, windshield wipers, motor fuel pumps, brake valves [ABS]) and the interference-laden ignition systems, which operate in this case next to one another in a very confined space. In addition to that, both the operating speed of the operational elements (band width) and the density of the operational components are increasingly rising. Sensitive sensing lines and lines for motor operators that draw heavily on voltage run close to each other over long stretches. Given this operational variety a faulty control can have disastrous consequences through their reciprocal influence on other devices (e.g., of the brake system or the airbag). Therefore, special care of connectors for controlling the reciprocal influences is suggested.

It is therefore the task of the present invention to design a contact safety device for pin-and-socket connectors in such a way that spurious releases of the airbags are prevented as much as possible.

The basic idea of the present invention is to provide a safety mechanism to secure ignition contacts of the primer against interference in the safety contact device, whereby the safety mechanism is connected with a shorting bar in such a way that the safety mechanism automatically goes into operation when/after the shorting bar is separated.

A further significant aspect of the invention lies in the arrangement of the safety mechanism outside of the ignitor, especially in the isolating ring.

Varistors can be used, for instance, as a safety mechanism. Varistors are voltage-dependent resistors with symmetrical U/I characteristics. The resistance of the varistors falls with increasing voltage. Connected parallel to the protective component or connection, the varistor forms a low ohm shunt when the voltage increases and in this way prevents a further increase of the surge voltage.

In a general working embodiment the present invention therefore concerns a contact safety device (1) for electrical pin-and-socket connectors with an inserted state and a preassembled state, which is suited for use between a primer for airbags and a control device of a motor vehicle, with the following properties:

an isolating ring (11),
a shorting bar (3) integrated into the isolating ring (11) to short out contact springs (4) of the primer when the pin-and-socket connector is in the preassembled state, whereby the shorting bar (3) consists of two separable conducting elements (3.1, 3.2) relating to each other,
in each case a circuit element (3.1$s$, 3.2$s$) of each conducting element (3.1, 3.2) with a contact position and separated position, whereby at least one circuit element (3.1, 3.2) is designed in such a way that the circuit elements (3.1, 3.2) change from the contact position to the separated position when the pin-and-socket connector attains its inserted state,
a contact safety device (9) against interference, which contacts both circuit elements (3.1, 3.2) at least in the inserted state.

According to an embodiment of the invention the safety mechanism is designed so it is integrated into the isolating ring.

The shorting bar can, for instance, consist of two protective contact springs, whereby each protective contact spring corresponds to an ignition contact of the primer, and between the contact springs a protective element, for example, a varistor, produces the contact as soon as the pin-and-socket connector is fully assembled.

The varistor, which under certain conditions consists of sintered zinc oxide with other metal ceramics, has a polycrystalline ceramic with predicable voltage dependency.

Through the positioning of the safety mechanism, which can contain an ESD and/or EMC protective element in the isolating ring, no structural changes to the ignitor itself are necessary. Furthermore, nothing changes in the assembly because one can fall back on known component parts. As a consequence, existing assembly devices can also be continued to be used.

The two conducting protective contact springs can be designed so that they are mirror symmetric or structurally identical in an advantageous way. As a result of which, the production costs are further reduced.

The connection of the safety mechanism with the conducting components can take place through insertion or through a simple arrangement. Other conducting connections are also conceivable, such as, for instance, clamping or screwing, whereby an easy assembly and a space-saving arrangement constitute the primary consideration.

Further designs of the invention follow from the description of the figures and the claims, whereby every possible combination of the patent claims is an object of the invention.

Keeping the same reference numbers for the same components, the figures in the drawings show the following in detail:

FIG. 1$a$ to $d$: various views of an embodiment according to the invention of the contact safety device/shorting bar with the pin-and-socket connector in a pre-assembled state or the shorting bar in a contact position FIG. 1$a$: perspective view of the contact safety device from below (from the view of the connector)

FIG. 1$b$: perspective view of the contact safety device according to the invention from above (from the view of the ignitor)

FIG. 1$c$: perspective view of the shorting bar

FIG. 1$d$: top view onto the contact safety device according to the invention from above (from the view of the ignitor)

Figure 2A:
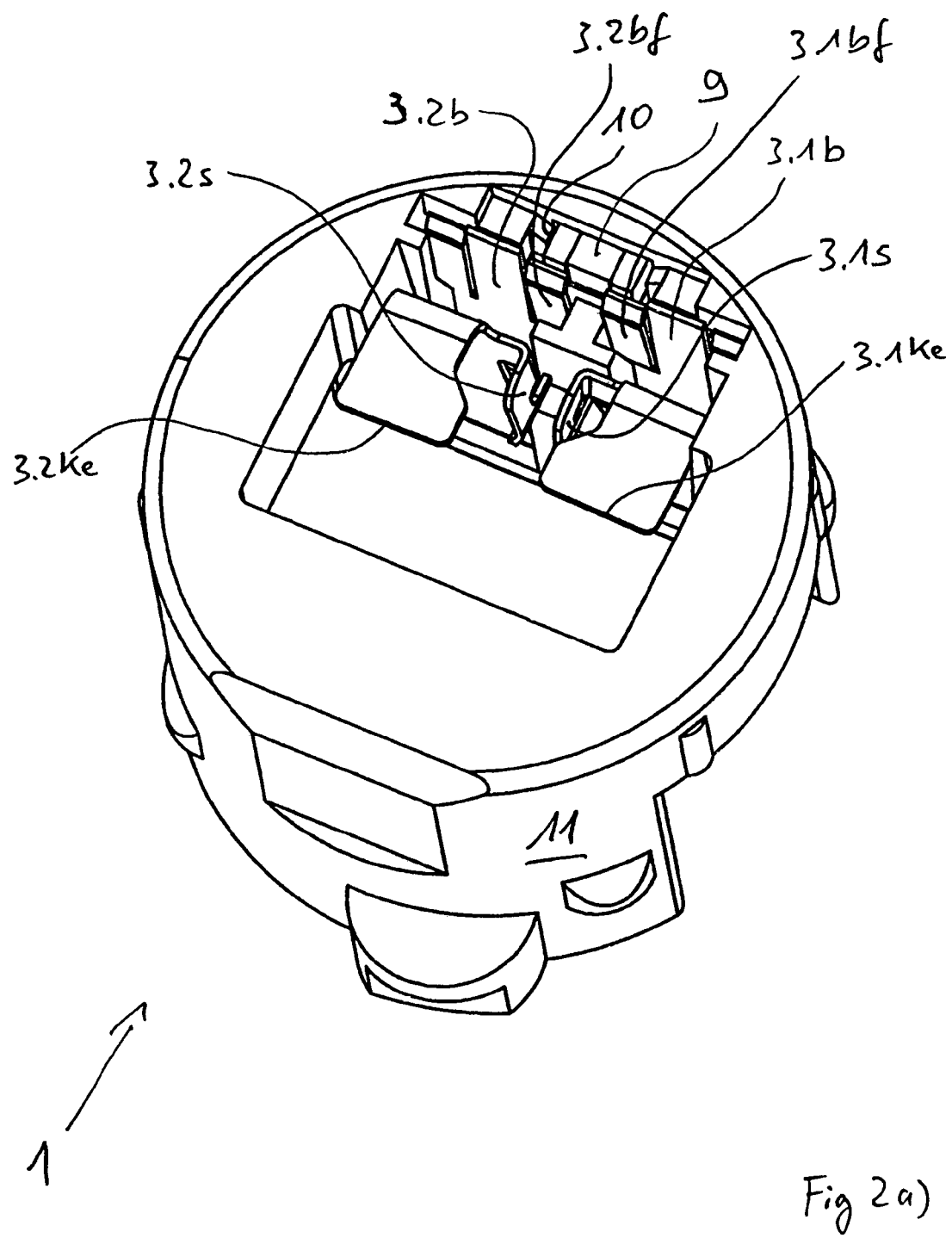

FIG. 2$a$ to 2$d$: various views of an embodiment according to the invention of the contact safety device/shorting bar when the pin-and-socket is in an inserted state or the shorting bar is in a separated state FIG. 2a: perspective view of the contact safety device according to the invention from below (from the view of the connector)

FIG. 2b: perspective view of the contact safety device according to the invention from above (from the view of the ignitor)

Figure 2C:
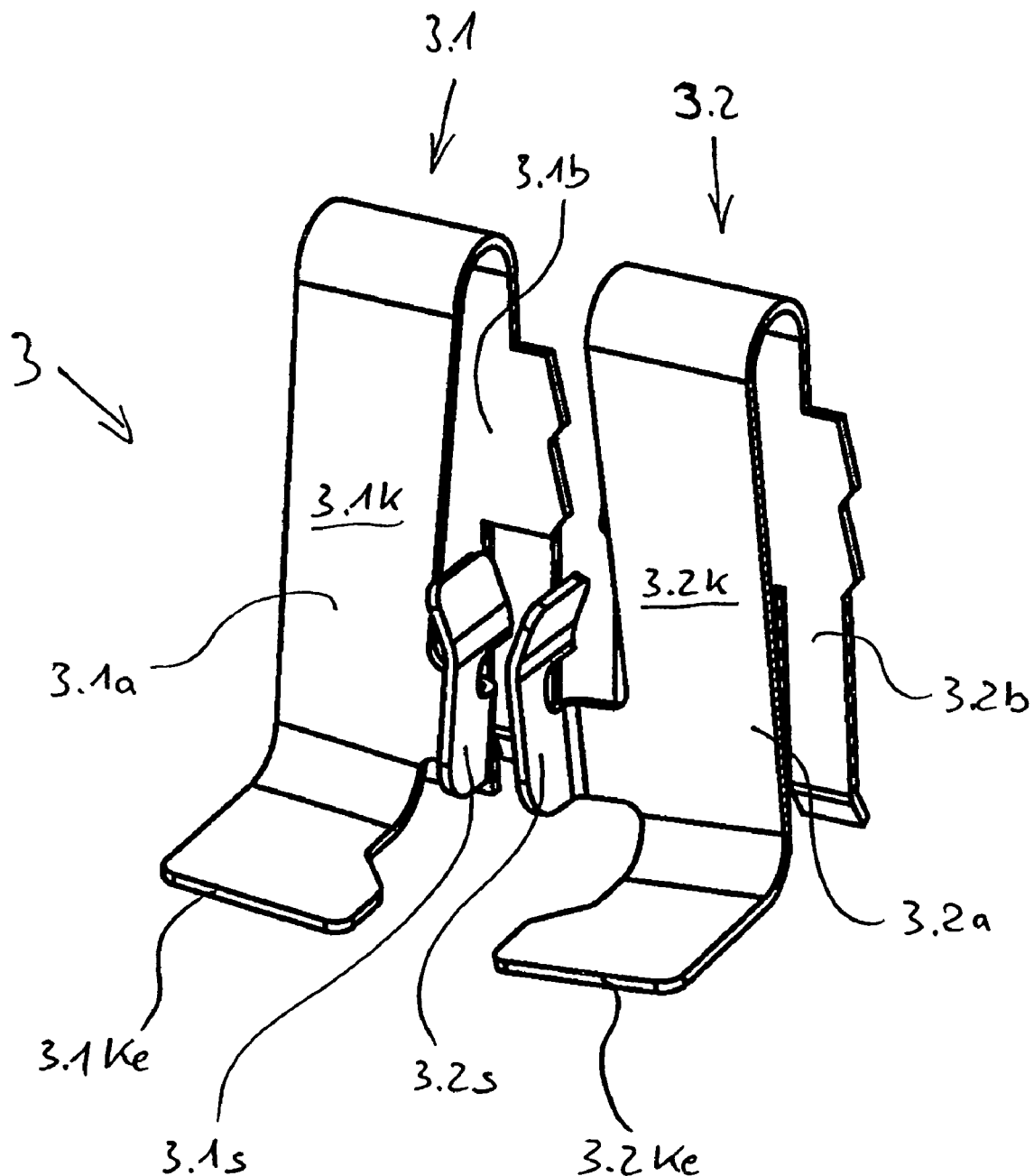

FIG. 2c: perspective view of the shorting bar

Figure 2D:
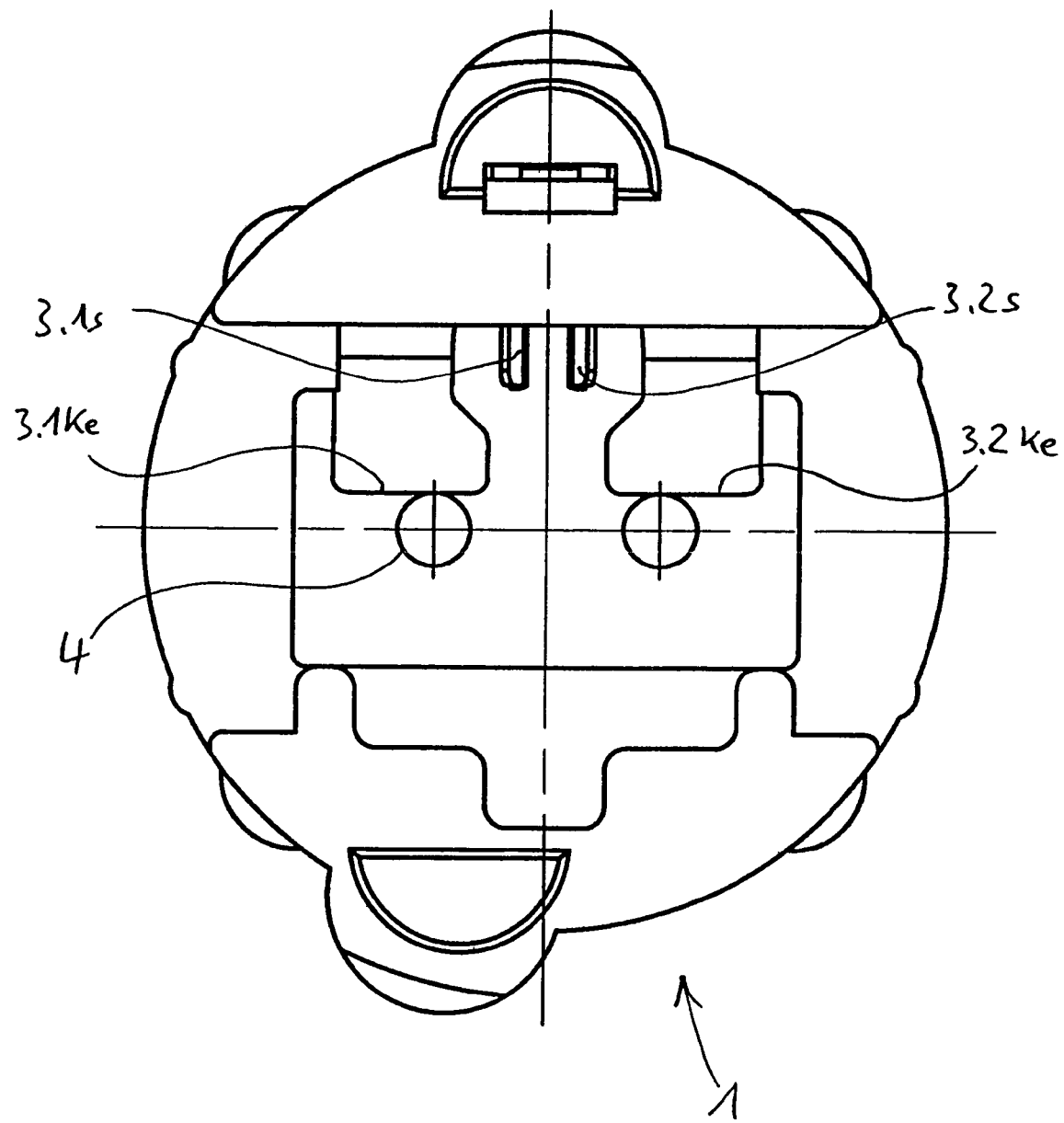

FIG. 2d: top view onto the contact safety device according to the invention from above (from the view of the ignitor).

In the figures the ignitor, pin-and-socket connector, and latching element are not represented or are only incompletely represented and are assumed to be known. In the working examples described here the outer dimensions of the contact safety device are essentially identical. They can be/are, however, adapted to every other geometric form of primers/pin-and-socket connectors. Partly represented latching elements are also not clarified. The representation has been greatly enlarged for better recognition.

Figure 1B:
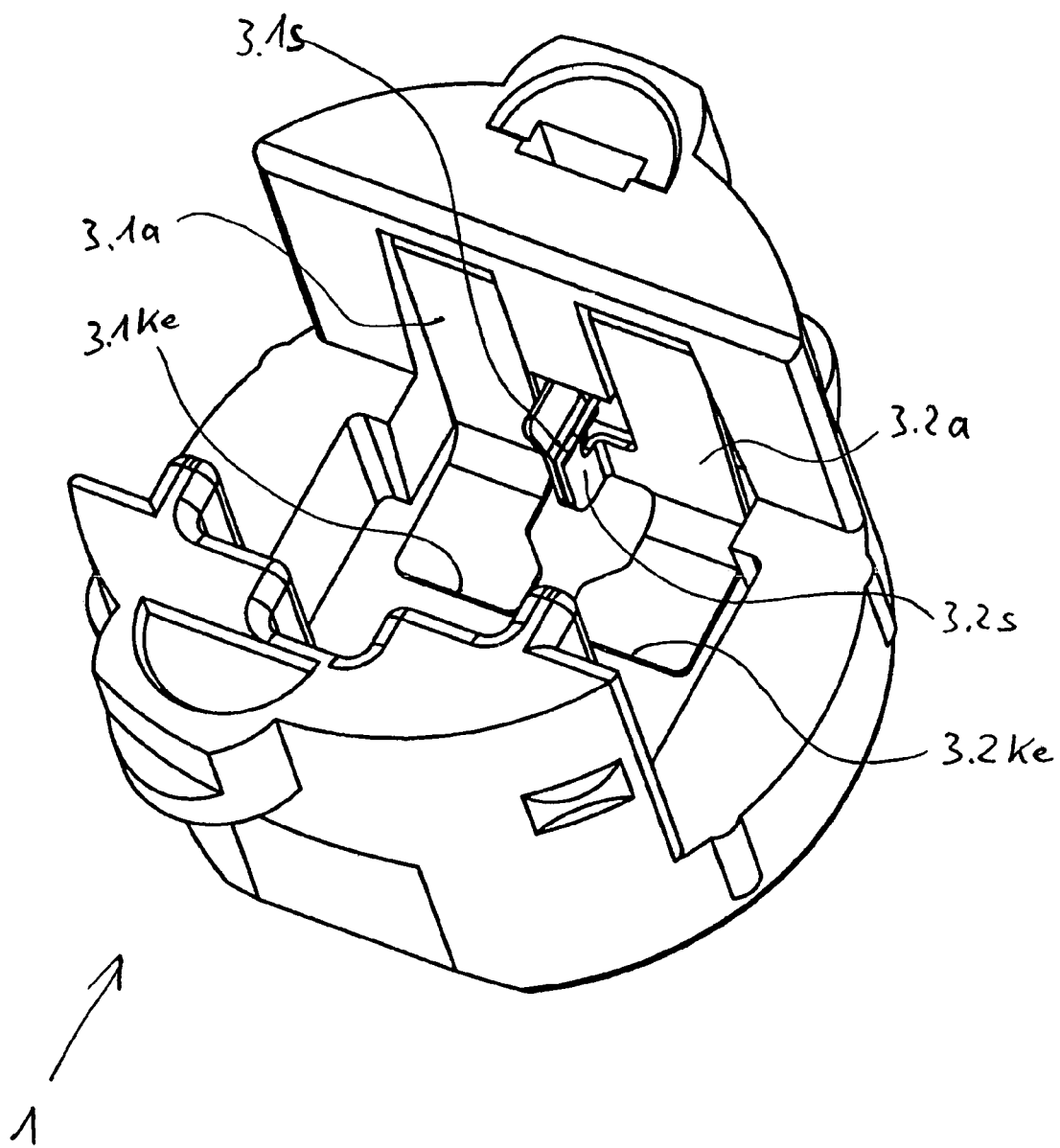
Figure 1C:
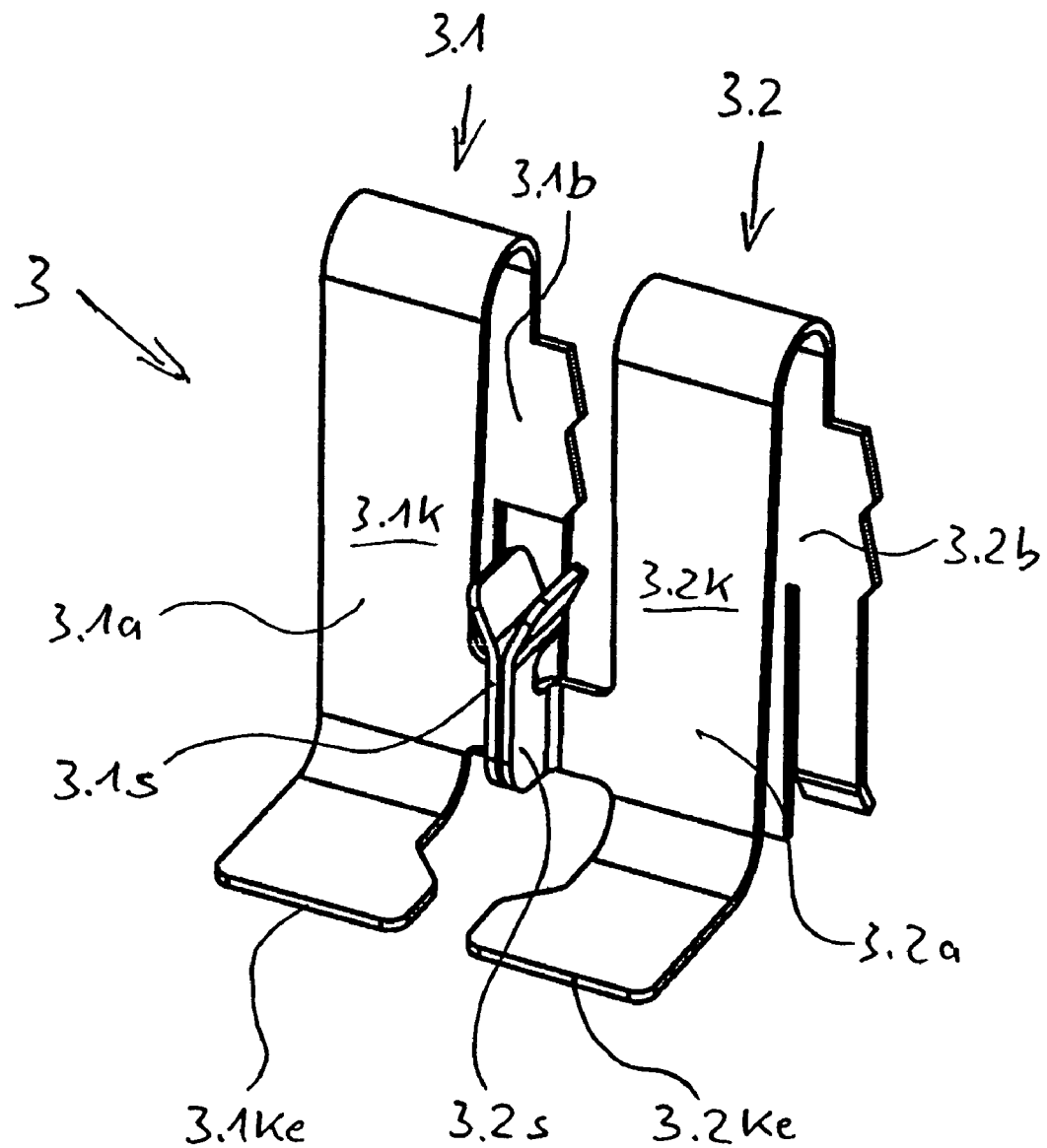
Figure 1D:
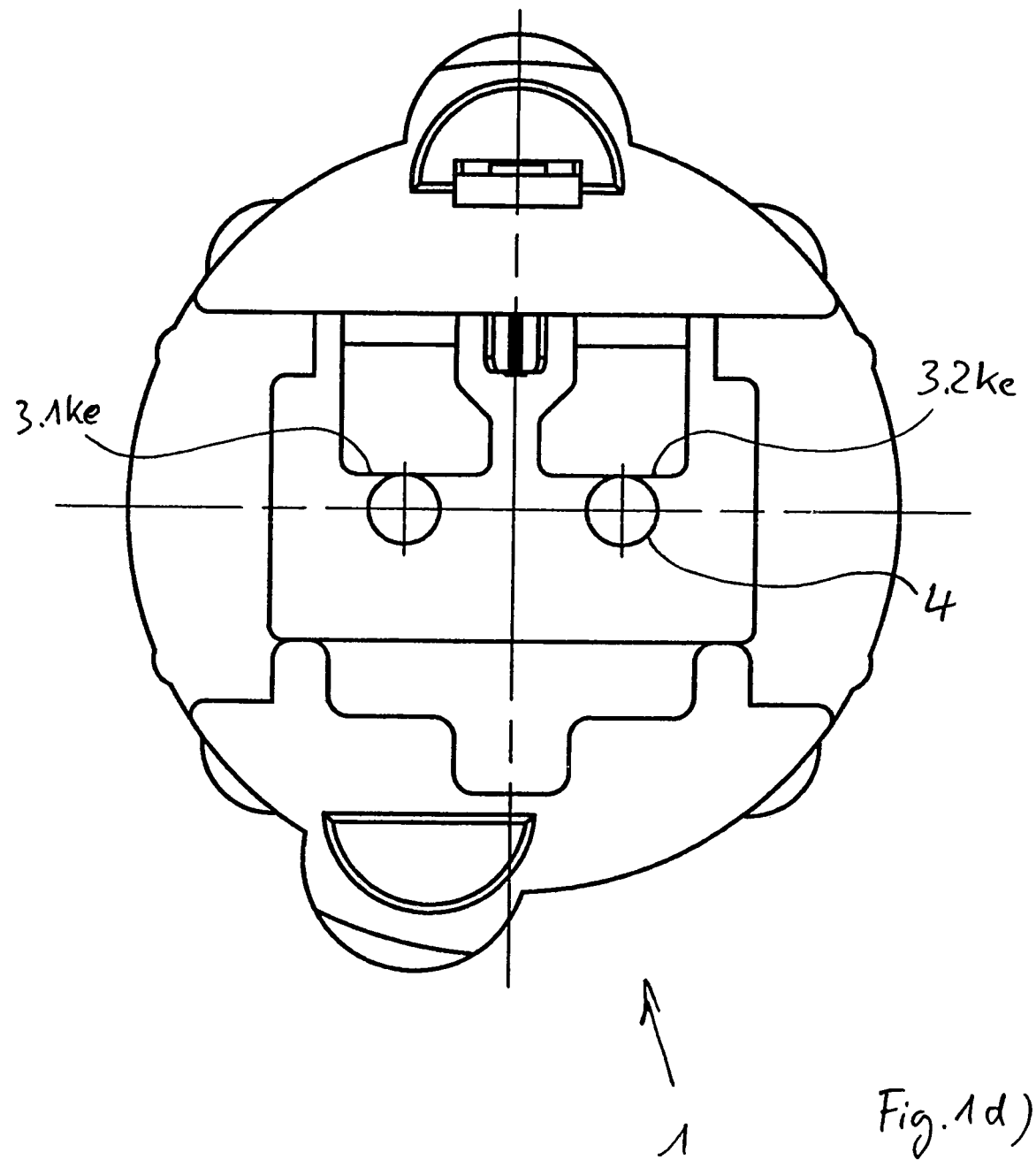

The FIGS. 1a, 1b, and 1d show a contact safety device 1 with an integrated shorting bar 3 with the pin-and-socket connector in a preassembled state or the shorting bar 3 in a contact position. In FIG. 1d it is shown that a contact spring 4 of the ignitor (not shown) is in contact with a protective contact spring end 3.1ke and another contact spring 4 of the ignitor is in contact with a protective contact spring end 3.2ke, whereby the protective contact spring ends 3.1ke/3.2ke, which belong to each of the protective contact springs 3.1k/3.2k, are connected in each case via a circuit element 3.1s/3.2s formed on the protective contact spring 3.1k/3.2k. As a result, a short circuit connection between the two contact springs 4 of the ignitor is produced through the conducting elements 3.1/3.2 of the shorting bar 3, which are formed here as protective contact springs 3.1k/3.2k.

To illustrate the geometric form of the shorting bar provided here, the shorting bar is shown in FIG. 1c. The two conducting elements of the protective contact springs 3.1/3.2, reflected on an imaginary axis, are—as stated—in contact on two contact surfaces of the circuit element 3.1s/3.2s. The circuit elements 3.1s/3.2s are each angled, as one piece, with a contact arm 3.1a/3.2a of each protective contact spring 3.1k/3.2k.

The U shaped protective contact springs 3.1k/3.2k, formed from the two contact arms 3.1a/3.2a and second arms 3.1b/3.2b, extend essentially along the insertion direction of the pin-and-socket connector or essentially parallel to the contact springs 4 of the ignitor. To maintain a distance to the contact springs and yet to produce contact, protective contact spring ends 3.1ke/3.2ke are brought on at a right angle to the contact arms 3.1a/3.2a in the direction of the contact springs 4 and are in constant contact with the contact springs 4 of the ignitor through the initial spring stress of the protective contact spring 3.1k/3.2k as long as the contact safety device 1 is inserted in the ignitor mount.

In FIG. 1a a safety mechanism 9 can be seen, which is in contact here, as a varistor, with the second arms 3.1b/3.2b via the spring shackles 3.1bf/3.2bf that are formed on the second arms 3.1b/3.2b. The safety mechanism 9 is located in a pocket 10 of the isolating ring 11 of the contact safety device 1 and is held in the pocket 10 through the elastic force of the spring shackles 3.1bf/3.2bf, which are brought on at an angle.

The safety mechanism 9 is in constant contact with the spring shackles 3.1bf/3.2bf, both when the pin-and-socket connector is in an inserted state and in a preassembled state, and both when the shorting bar is in the contact position and in its separated position. As soon as the separated position represented in FIGS. 2a to 2d exists, the two conducting elements 3.1/3.2 come into conductive contact only through the safety mechanism 9.

The separation of the conducting elements 3.1/3.2 occurs here through an actuator in the connector, not shown, which is inserted between the Y-shaped circuit elements 3.1s/3.2s when the electrical pin-and-socket connector obtains its inserted state. In this way the contact surfaces of the circuit elements 3.1/3.2 are separated and the only connection of the conducting elements 3.1/3.2 arises in the varistor.

In FIGS. 1d and 2d one can see that the safety contact spring ends 3.1ke/3.2ke are only pushed along on the contact springs and are in constant contact with the contact springs 4.

LIST OF REFERENCE NUMBERS 1 contact safety device
3 shorting bar
3.1 conducting element
3.2 conducting element
3.1a contact arm
3.1b second arm
3.2a contact arm
3.2b second arm
3.1bf spring shackle
3.2bf spring shackle
3.1s circuit element
3.2s circuit element
3.1k safety contact spring
3.2k safety contact spring
3.1ke safety contact spring end
3.2ke safety contact spring end
4 contact spring
9 safety mechanism
10 pocket
11 isolating ring

The invention claimed is:

1. A contact safety device for electrical pin-and-socket connectors with an inserted state and a preassembled state, which is suited for use between a primer for airbags and a control device of a motor vehicle, said contact safety device comprising:

an isolating ring;
a shorting bar integrated into the isolating ring configured to short out contact springs of the primer when the pin-and-socket connector is in the preassembled state, whereby the shorting bar contains two separate conducting elements relating to each other, each conducting element having a corresponding circuit element, the circuit elements cooperating in a contact position and separated spaced position, whereby at least one of the circuit elements is designed in such a way that the circuit elements change from the contact position to the separated position when the pin-and-socket connector attains its inserted state; and
a contact safety member against interference, which contacts the two separate conducting elements at least in the inserted state, so that the two separate conducting elements are connected only by the contact safety member,
the separate conducting elements being designed as protective contact springs, whereby each of the protective contact springs contact the contact springs of the primer with their protective contact spring ends, and the contact safety member produces a working connection between the protective contact springs.

2. A contact safety device according to claim 1 in which the shorting bar is integrated into the isolating ring.

3. A contact safety device according to claim 1 in which the separate conducting elements are essentially mirror symmetric to each other.

4. A contact safety device according to claim 1 in which the contact safety member is a varistor.

5. A contact safety device according to claim 1 in which the separate conducting elements are permanently in contact with a respective contact spring of the primer.

6. A contact safety device according to claim 1 in which the separate conducting elements are each shaped as a U and in each case a first contact arm thereof is brought on at a right angle to the contact springs of the primer.

7. A contact safety device according to claim 6 in which second arms of each conducting element are in contact with the contact safety member.

8. A contact safety device according to claim 1 in which the contact safety member is connected parallel to the contact springs of the primer.

9. A contact safety device according to claim 1 in which the contact safety member is permanently in contact with the separate conducting elements.

10. Pin-and-socket connector with a contact safety device according to claim 1.

11. A contact safety device for electrical pin-and-socket connectors with an inserted state and a preassembled state, which is suited for use between a primer for airbags and a control device of a motor vehicle, said contact safety device comprising:

an isolating ring;
a shorting bar integrated into the isolating ring configured to short out contact springs of the primer when the pin-and-socket connector is in the preassembled state, whereby the shorting bar contains two separate conducting elements relating to each other, the separate conducting elements being essentially mirror symmetric to each other, each conducting element having a corresponding circuit element, the circuit elements cooperating in a contact position and separated spaced position, whereby at least one of the circuit elements is designed in such a way that the circuit elements change from the contact position to the separated position when the pin-and-socket connector attains its inserted state; and
a contact safety member against interference, which contacts the two separate conducting elements at least in the inserted state, so that the two separate conducting elements are connected only by the contact safety member.

12. A contact safety device for electrical pin-and-socket connectors with an inserted state and a preassembled state, which is suited for use between a primer for airbags and a control device of a motor vehicle, said contact safety device comprising:

an isolating ring;
a shorting bar integrated into the isolating ring configured to short out contact springs of the primer when the pin-and-socket connector is in the preassembled state, whereby the shorting bar contains two separate conducting elements relating to each other, each conducting element having a corresponding circuit element, the circuit elements cooperating in a contact position and separated spaced position, whereby at least one of the circuit elements is designed in such a way that the circuit elements change from the contact position to the separated position when the pin-and-socket connector attains its inserted state;
a contact safety member against interference, which contacts the two separate conducting elements at least in the inserted state, so that the two separate conducting elements are connected only by the contact safety member; and
the separate conducting elements are each shaped as a U and in each case a first contact arm thereof is brought on at a right angle to the contact springs of the primer, and second arms of each conducting element are in contact with the contact safety member.

13. A contact safety device for electrical pin-and-socket connectors with an inserted state and a preassembled state, which is suited for use between a primer for airbags and a control device of a motor vehicle, said contact safety device comprising:

an isolating ring;
a shorting bar integrated into the isolating ring configured to short out contact springs of the primer when the pin-and-socket connector is in the preassembled state, whereby the shorting bar contains two separate conducting elements relating to each other, each conducting element having a corresponding circuit element, the circuit elements cooperating in a contact position and separated spaced position, whereby at least one of the circuit elements is designed in such a way that the circuit elements change from the contact position to the separated position when the pin-and-socket connector attains its inserted state; and
a contact safety member against interference, which permanently contacts the two separate conducting elements at least in the inserted state, so that the two separate conducting elements are connected only by the contact safety member.

* * * * *